United States Patent
Kemmler et al.

(10) Patent No.: US 9,098,629 B2
(45) Date of Patent: Aug. 4, 2015

(54) SYSTEM AND METHOD FOR REVERSIBILITY CATEGORIES AND CHARACTERISTICS OF COMPUTER APPLICATION FUNCTIONS

(75) Inventors: Andreas Kemmler, Boenigheim (DE); Torsten Kamenz, Weisloch (DE)

(73) Assignee: SAP SE, Walldorf (DE)

( * ) Notice: Subject to any disclaimer, the term of this patent is extended or adjusted under 35 U.S.C. 154(b) by 1170 days.

(21) Appl. No.: 12/957,610

(22) Filed: Dec. 1, 2010

(65) Prior Publication Data

US 2012/0144370 A1 Jun. 7, 2012

(51) Int. Cl.
*G06F 9/44* (2006.01)
*G06F 11/36* (2006.01)

(52) U.S. Cl.
CPC ........ *G06F 11/3664* (2013.01); *G06F 11/3672* (2013.01)

(58) Field of Classification Search
CPC ..... G06F 11/22; G06F 11/2205; G06F 11/26; G06F 11/263; G06F 11/3664; G06F 11/3672; G06F 11/368; G06F 11/3688; G06F 11/3696; G06F 11/3684
USPC ....................................................... 717/124
See application file for complete search history.

(56) References Cited

U.S. PATENT DOCUMENTS

| | | | | |
|---|---|---|---|---|
| 5,359,546 A * | 10/1994 | Hayes et al. | ................ | 702/123 |
| 5,974,255 A * | 10/1999 | Gossain et al. | ................ | 717/124 |
| 7,055,067 B2 * | 5/2006 | DiJoseph | ................ | 714/38.1 |
| 7,581,208 B2 * | 8/2009 | Aoyama et al. | ................ | 717/124 |
| 7,664,989 B2 * | 2/2010 | Joshi et al. | ................ | 714/38.14 |
| 8,276,123 B1 * | 9/2012 | Deng et al. | ................ | 717/125 |
| 8,286,136 B2 * | 10/2012 | Aoyama et al. | ................ | 717/125 |
| 8,359,493 B2 * | 1/2013 | Peng et al. | ................ | 714/15 |
| 2004/0031014 A1 * | 2/2004 | Baecker et al. | ................ | 717/104 |
| 2004/0073889 A1 * | 4/2004 | Baecker et al. | ................ | 717/121 |
| 2005/0114838 A1 * | 5/2005 | Stobie et al. | ................ | 717/124 |
| 2006/0212540 A1 * | 9/2006 | Chon et al. | ................ | 709/218 |
| 2007/0150869 A1 * | 6/2007 | Tateishi et al. | ................ | 717/127 |
| 2007/0220347 A1 * | 9/2007 | Kirtkow et al. | ................ | 714/38 |
| 2008/0066058 A1 * | 3/2008 | Aoyama et al. | ................ | 717/125 |
| 2008/0120603 A1 * | 5/2008 | Chace | ................ | 717/126 |
| 2008/0270993 A1 * | 10/2008 | Tateishi et al. | ................ | 717/127 |
| 2012/0110382 A1 * | 5/2012 | Tang et al. | ................ | 714/32 |

OTHER PUBLICATIONS

A Framework for Specification-Based Testing Phil Stocks and David Carrington, Member, IEEE Computer Society —IEEE Transactions on Software Engineering, vol. 22, No. 11, Nov. 1996.*

(Continued)

*Primary Examiner* — Lewis A Bullock, Jr.
*Assistant Examiner* — Francisco Aponte
(74) *Attorney, Agent, or Firm* — Kenyon & Kenyon LLP (57) ABSTRACT

Disclosed embodiments provide a system, machine-readable medium, and a method that may test computer application functions. A system provides for testing a computer application function by analyzing a testing characteristic of the computer application function information. Based on the analysis of the testing characteristic, the computer application function may be activated for testing in any one of a plurality of test environments. The test environment is selected according to the testing characteristic that indicates the effects that the testing of the selected computer application has on the test environment. This allows users to select a test environment based on the effects that it has on a test system.

24 Claims, 4 Drawing Sheets

(56) References Cited

OTHER PUBLICATIONS

A Framework for Proactive Self-adaptation of Service-Based Applications Based on Online Testing—Julia Hielscher, Andreas Metzger—SSE, University of Duisburg-Essen, Schutzenbahn 70, 45117 Essen, Germany—Raman Kazhamiakin, Marco Pistore—FBK-Irst, via Sommarive 18, 38050, Trento, Italy—ServiceWave 2008, LNCS 5377, pp. 122-133, 2008.*

* cited by examiner

SYSTEM AND METHOD FOR REVERSIBILITY CATEGORIES AND CHARACTERISTICS OF COMPUTER APPLICATION FUNCTIONS

BACKGROUND

The disclosed subject matter relates to a system and method for specifying reversibility categories and characteristics to a computer application function. In particular, the disclosed subject matter relates to a computerized testing tool for implementing a testing regimen that more efficiently utilizes testing resources and provides more realistic test scenarios for computer application function testing.

Computer applications are frequently updated with the upgraded features provided for customer installation in update packages, such as enhancement packages and support packages. Commonly, computer application enhancement packages that have been thoroughly tested by a software computer application developer are further tested by customer software developers or information technology teams to insure satisfactory implementation and operation on customer computer systems. This testing may take many forms depending upon the sophistication of the user. For users that are very sophisticated and that may have massive computer systems and a large number of users of a computer application, effective testing of any enhancement packages may take a number of days, and if the enhancement package is substantial, may require rigorous testing at the customer site. The enhancement package testing may include testing the software of the enhancement package on development platforms, dedicated test platforms and/or on a maintenance platform. Each of the different platforms have a different level of complexity that may require different actions prior to performing and during the testing of the computer application functions that are being enhanced by the enhancement package.

Figure 1:
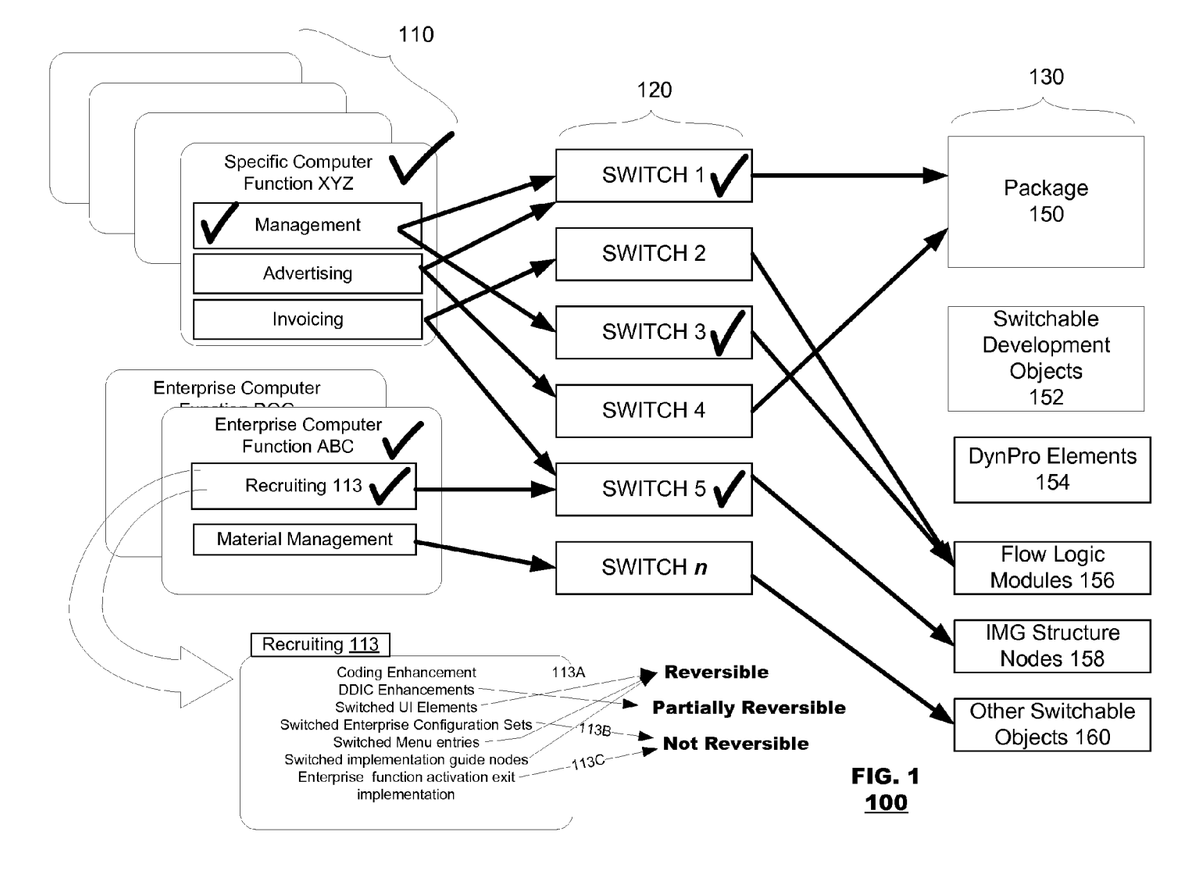
FIG. 1 illustrates a graphical representation of the selection of a computer application function from an enhancement package.

For example, FIG. 1 illustrates a graphical representation of the operation of a tool for facilitating use of the implementation guide for selection of a computer application function. New functionality must be explicitly "switched on" to become active/visible in the system. A "computer application function" is the unit within an enhancement package which can be activated/switched on. Activating a computer application function triggers switches, which then "influence" the execution of the computer code enhancements. These switches ensure that customers can only see and make use of the new functionality that has been activated. In FIG. 1, a tool 100 presents, in a graphical user interface, a list of computer application functions 110 included in the enhancement package. The user may select a function to be implemented by selecting the function in a graphical user interface by, for example, selecting a check box with an input device (e.g., mouse or keyboard (not shown)) that sets an indication (e.g., inserts a checkmark) when selected by the user. As the selections are made, the graphical user interface will cause switches 1, 3 and 5 in a switch framework 120 to be activated. The selected functions may represent nodes, e.g., specific computer application function XYZ, or enterprise computer application function ABC, and/or specific subnodes, e.g., management or recruiting. Note that more than one node, and more than one subnode, may be selected. The activated switches 1, 3 and 5 may allow for implementation of the associated computer objects 150, 152, 154, 156, 158 and 160 in the list of computer objects 130 for providing the selected functions.

The selected computer application functions, such as recruiting 113, may include a number of enhancements that have been added and/or are previous features that have been changed. As shown, in recruiting 113, the enhancements may include a coding enhancement 113A, DDIC enhancements, switched UI elements, switched business configuration sets, switched menu entries, switched implementation guide nodes, and business function activation exit implementation 113C. Some of these enhancements, such as coding enhancement 113A, may be reversible meaning that after installation these enhancements may be removed or switched off. Meanwhile, enhancements switch business configuration sets 113B and computer application function activation exit implementation 113C are not reversible. The problem arises in that each of the enhancements 113A, 113B and 113C shown within the business function 113 are not separately switchable, so reversible individual enhancements 113A and 113B cannot be reversed and the remaining enhancements remain activated. If one enhancement is not reversible, such as 113C, then the entire computer application function 113 is not reversible. Accordingly, the number of computer application functions in all of the computer application functions shown selected in FIG. 1 few are actually reversible. In order to evaluate a computer application function that is not reversible, a separate test system is required.

Accordingly, most users use test systems to test the enhancement package prior to implementation of the enhanced computer application function in the production system. This is because the status of a computer application function may be set globally in a customer system so that this status is the same in every client in the system. Continuing tests in the main test clients would mean that these tests are done in the environment of the activated computer application functions. The tests in the main test client could therefore produce data which are no longer valid when this reversible computer application function is deactivated and as a result the whole main test client may become useless. Additionally, the original environment might be influenced by the activated computer application function in a way that the results of the tests are no longer meaningful.

The inventors have recognized the benefits of a system of evaluating the enhancements within a computer application function to allow those that are not reversible to be effectively tested without a separate specific or special test, set up, or in non-production systems.

DETAILED DESCRIPTION

Described embodiments may provide for automatically selecting a computer test environment for testing a computer application function provided in a computer application enhancement package. In a graphical user interface generated by a processor, a listing of computer application functions provided in the enhancement package for activation may be presented. In response to an input to the graphical user interface selecting a computer application function, the graphical user interface may indicate the reversibility status of the selected function in the graphical user interface, and the recommended test set up for testing the selected function. The reversibility status may be one of reversible, reversible with restrictions, and not reversible. The selected computer application function may be installed in a test environment suited for testing the selected computer application function based on the reversibility status.

Embodiments may provide for testing computer application functions by a processor that may analyze a computer application function to determine a testing category assigned to the computer application function. Based on the analysis, a processor may indicate the testing category of the computer application function as either a first testing category, a second testing category or a third testing category. In response to the indication provided by the processor that the testing category of the computer function is the first category, the computer application function may be activated in a first test environment. In response to the indication provided by the processor that the testing category of the computer function is the second category, the computer application function may be activated in a second test environment. In response to the indication provided by the processor that the testing category of the computer function is the third category, the processor may analyze the computer application function to determine a testing characteristic, wherein a testing characteristic is a sub-category of the testing category. The computer application function may be tested in the respective test environment.

Figure 2:
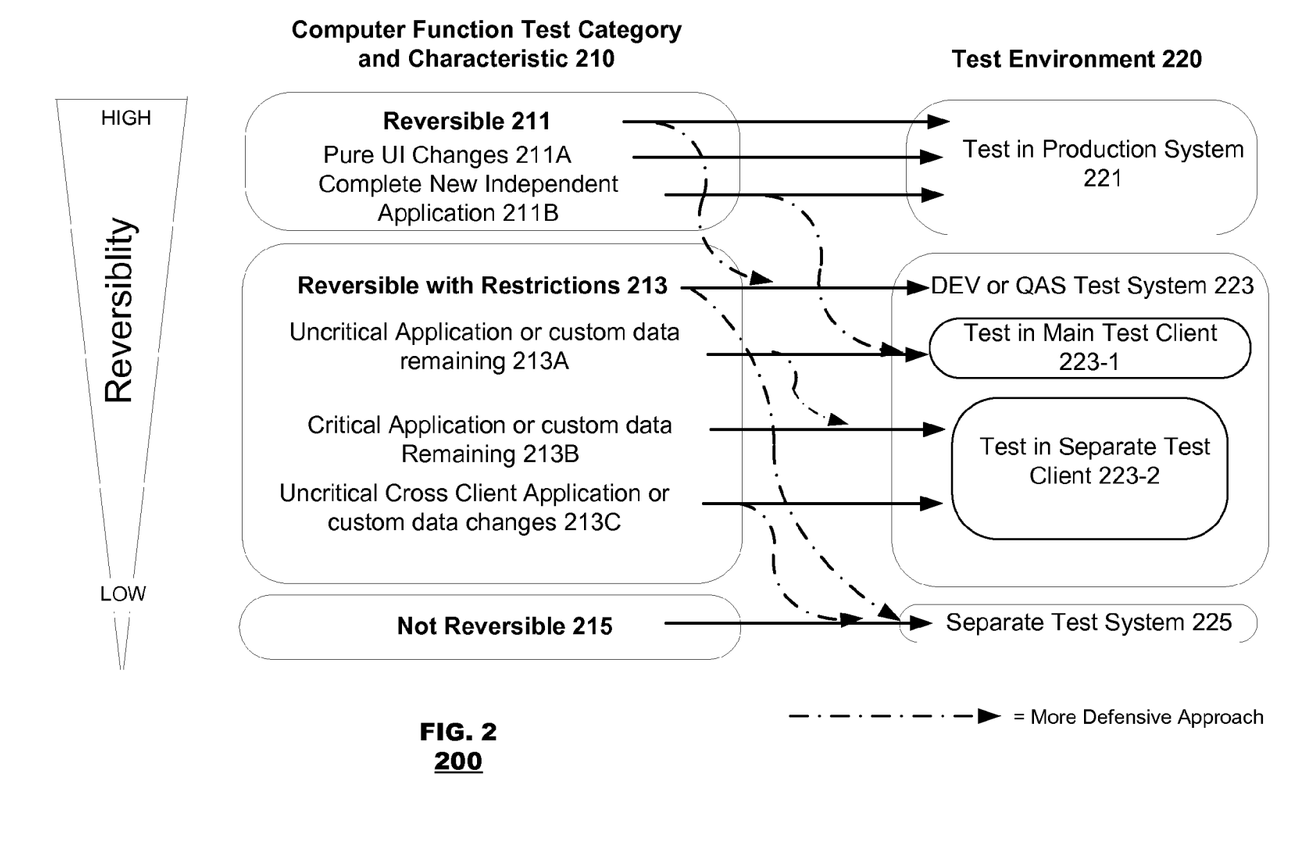
FIG. 2 illustrates a graphic of recommended testing solutions according to an embodiment of the present invention.

FIG. 2 illustrates a graphic of recommended testing solutions according to an embodiment of the present invention. The testing solutions 200 may provide according to computer application function testing categories and testing characteristics 210 to provide a recommended test environment 220. Testing characteristics may be sub-categories under the testing categories, and that may provide an additional level of granularity to the testing categories. As illustrated by the reversibility graphic on the left hand side, the computer application function testing categories 210 are arranged from a high reversibility to low reversibility. For example, the computer application function category reversible 211 is at the top of the reversibility graphic indicating high reversibility, while the computer application function category not reversible 215 is at the bottom of the reversibility graphic indicating low reversibility. The category and characteristic, if applicable, of a selected computer application function may be stored as an attribute in a data structure associated with the selected computer application function. For example, a look-up table may be established with reversibility category and characteristics each of the computer application functions in an enhancement package, or for an entire application. Of course, the testing categories and/or testing characteristics provided are only exemplary, and more or different testing categories and/or testing characteristics may be implemented.

In more detail, the ability of some functions to be reversed once activated may be limited. A reversible computer application function may be switched on and off even in productive systems. In general terms, the execution of a reversible computer application function in the production system does not produce new application data for existing applications that can only be accessed when the computer function is switched on or data artifacts that may adversely affect system performance or stability, if switched off. Reversible computer application functions may be listed in a reversible category 211 may be a pure user interface changes 211A and complete new independent application 211B.

A purely user interface (UI) change 211A may indicate a computer application function that merely changes the user interface without affecting other computer application functions (i.e., the change is only to the UI) to offer a set of UI changes. The UI changes might offer additional UI elements (an icon), hide existing UI elements (a radio button) or change the appearance of UIs (colors). Generally such computer application functions do not influence the data persistency, which means that no additional data is written to the database, or at least any data which can be accessed exclusively through the changed UI elements. In other words, a purely UI change may be only the appearance of UIs, additional fields/elements that are only for display of existing data or of transient/calculated data. New input elements may be bound to existing fields in existing database tables, and data written through such fields may remain at the database after deactivating the computer application function. However, the data may behave as written through alternative transactions and not disturb any applications remaining active. Computer application functions with this characteristic (Pure UI changes 211A) have no influence on the data persistence and therefore also no master data switches. Customers may be informed that deactivating such the computer application functions will not leave any application data on the test system. Therefore, pure UI changes 211A to a computer application function may pose no problem when deactivated in production computer systems.

Alternatively, another characteristic may be as complete new independent application 211B. The complete new independent application 211B characteristic may mean that the computer application function offers a completely new and mostly independent application. An independent computer application function may create, and/or change data during testing that is not used by any other application. Independent can also mean that the application is not creating its own data, but is used as an analytical tool to analyze, or to display data created by other applications. It may be recommended to customers that after testing, and when deactivating reversible computer application functions, the application offered with the computer application function is to no longer be accessible via any menu entry. The computer application function may appear hidden, exactly like before the computer application function was activated. In addition, the application data created with the application may not be deleted by deactivating the computer application function, but the remaining application data will not disturb any other application even if used directly.

The indicated test environment 220 for a computer application function indicated as reversible 221 may be a production system 221. Computer application functions that are reversible 221 can be deactivated even in productive systems. Reversible computer application functions may be tested there (even though it is unlikely that they will not be tested before in the QAS system). The dashed arrowed line indicates that also the reversible computer application functions 211 can be tested as part of a more defensive test approach in the DEV or QAS systems 223. The characteristic "Complete new independent application" 211B may also be tested in a more defensive test approach as indicated with the dashed arrow line from this characteristic to the box "Main Test Client" 223-1 in "Test in DEV/QAS System" 223.

Another categorization of a computer application function may be reversible with restrictions 213. Computer application functions indicated as reversible with restrictions may be prevented from being able to be deactivated in production systems in order to safeguard customer test equipment. However, it may be possible to deactivate/switch off the computer application function while testing on development and quality assurance systems 223.

The computer application function in the category reversible with restrictions 213 may include several characteristics such as an "uncritical application or "some customized data remaining" 213A in the database. Computer application functions with this characteristic may not be completely reversed. Uncritical, for example, may mean that some client dependent application data created during the test/evaluation of the computer application function or some client dependent customizing data extracted during the computer application function activation may not be reversed. This data may remain in the database tables even after the computer application function is deactivated. However, the remaining data may not disturb any applications as long as it is not used directly by another application during testing in the same test environment. This means any applications can be used/tested/evaluated as if the computer application function had never been activated as long as no such remaining data is used. If the remaining data is used, it may due to the data type or settings associated with the data for the system to respond as if the computer application function is still active, and/or may cause system failures, such as runtime errors or inconsistent data. Therefore, a restriction on computer application functions with this category may be that the data created during testing may not be explicitly used by another computer application function after the test. The evaluation of such computer application functions classified as reversible with restrictions 213 may be recommended to be performed in the main test system 223-1 or, in a more defensive approach, in a separate test client 223-2 where other tests may be performed. Testing may be organized such that the data remaining after the test is not used for any other tests. This can be done by creating during testing, data in a separate number range (if applicable) or by giving the objects created during the test a specific name or by manually deleting/canceling the data after the test (by using the corresponding application functionality).

Another characteristic of a reversible with restriction computer application function may be a critical application and/or customizing data remaining 213B characteristic. A computer application function with this characteristic cannot be reversed completely. Some client dependent application data created during the test/evaluation of the computer application function, or some client dependent customizing data extracted during the computer application function activation may also not be reversed. The customizing data may remain in the database tables even after the computer application function may be deactivated. Such remaining data might influence/disturb certain applications even after the deactivation of the computer application function. The disturbance caused may prevent other independent tests from being done with the affected applications because the affected applications do not behave as before the computer application function activation.

Customers may be informed that computer application functions with these characteristics may best be tested at least in a separate client. The separate client can be deleted after the test so that the critical application or customizing data may be deleted as well. Testing such computer application functions in a client where other tests also take place may not be recommended as these other tests might, for example, be corrupted by the data remaining after the computer application function deactivation.

Yet another characteristic of a reversible with restrictions computer application function may be "uncritical cross client application or custom data changes" 213C. Computer application functions with this characteristic may also not be reversed completely. During testing/evaluation, some client independent application data may be created or some client independent customizing data may be extracted during the computer application function activation cannot be reversed. Then customized data may remain in the database tables even when the computer application function may be deactivated. However, the remaining data may not disturb any applications in any client as long as it is not used directly. In other words, any applications can be used/tested/evaluated as if the computer application function had never been activated as long as the remaining customized data is not used directly. If the customized data is used, it may cause the computer system to act improperly as though the now-deactivated computer application function is still active or even cause computer system failures, such as runtime errors or inconsistent data. It may be recommended to customers that such computer application function may be tested in a separate test client 223-2, and the client independent data which remains after the test will not disturb any application in any client in the system at least not as long as it is not used directly. In a more defensive approach, the computer application function with the characterization of "uncritical cross client application or custom data changes" 213C may be tested in a separate test system 225 as though the category of the selected computer application function was "not reversible" 215.

Similarly, the category 'Reversible with Restrictions' 213 for which the more defensive approach may be tested in the same way as for "Not Reversible" 215 computer application functions. The different characteristics of 'Reversible with Restrictions' 213 range from 'being tested in the Main Test Client' 223-1 to 'be tested in a Separate Test Client' 223-2. For example, the defensive approach instead of 'testing in the main test client 223-1 may be to test in a separate test client 223-2; and the defensive approach for characteristic 'Critical application or customizing data remains' 213B is to test it in a separate test system 225.

There are general defensive approaches on category level and there are some additional defensive approaches on characteristic level. For example, there may be critical development objects assigned to a computer application function which cannot be reversed once they are activated. Critical may mean that these development objects may prevent the system from operating the same as before the computer application function activation, and that parts of the applications may therefore be in an undefined state. Alternatively, critical may mean that data created during the test of the activated computer application function cannot be undone. The data created may prevent the computer system from behaving as it did prior to the computer application function activation. The computer system may prevent critical functions from being deactivated/switched off. Software developers commonly recommend to customers to evaluate such critical computer application functions in a separate test system 225. The separate test system 225 may have to be setup anew to get the computer application function switched off again. Activating critical computer application functions in a main test system 223-1 for evaluating the computer application function could mean having to setup a new main test system 223-1 because the computer application functions cannot be deactivated without placing the test system in an undefined state. Examples of critical development objects may include data dictionary (DDIC) appends to database tables (as this could cause data deletion), DDIC appends to structures (as this could cause data deletion to customer tables), switch BC Sets for client independent tables which contain critical table entries, and critical application data in client independent tables which could have been created through the test of the computer application function.

Figure 3:
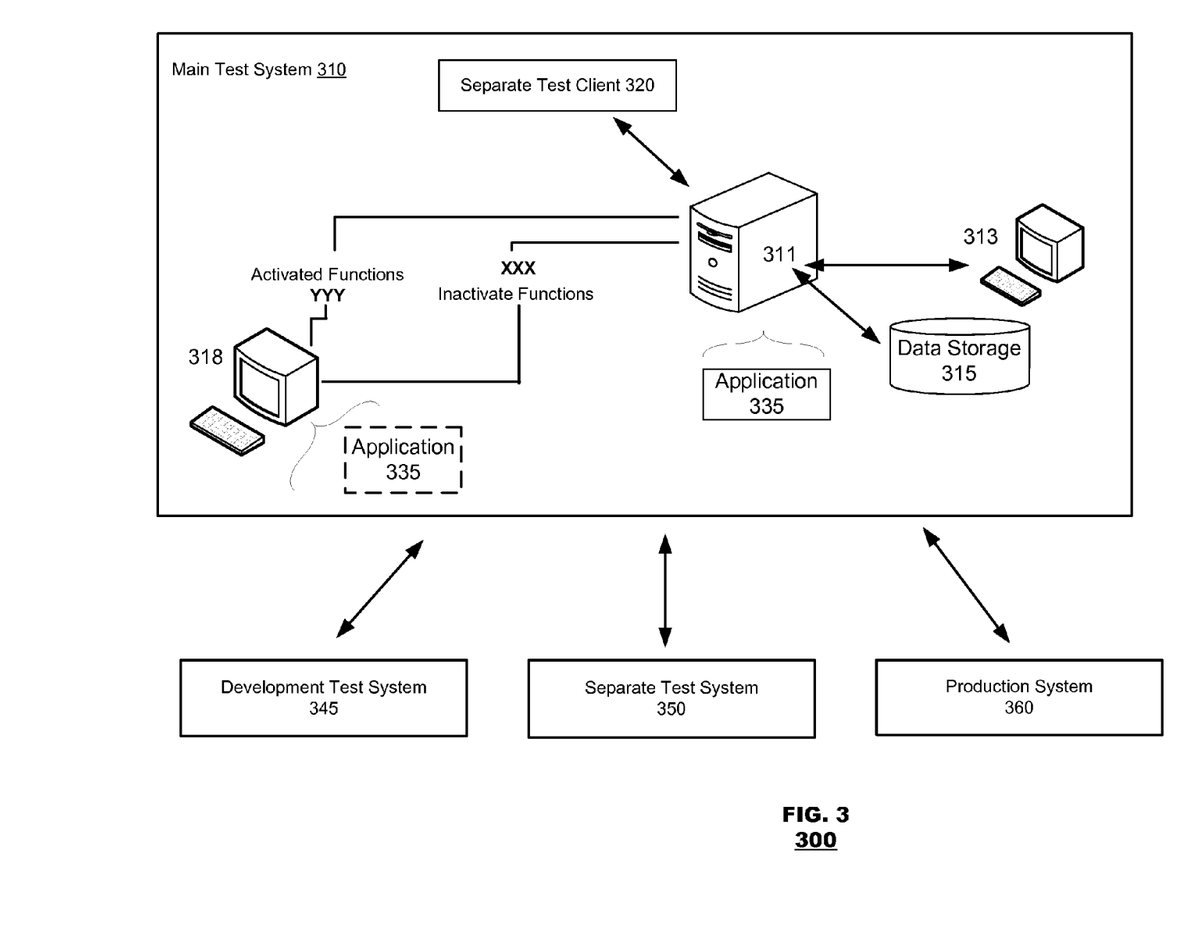
FIG. 3 illustrates an exemplary customer computer system according to an embodiment of the present invention.

FIG. 3 illustrates an exemplary customer computer system according to an embodiment of the present invention. With reference to FIG. 3, customer computer system landscape 300 may include a main test system 310, a Development Test System 345, Separate Test System 350, and a production system 360. The main test system 310 may include a server 311, a client terminal 313 and data storage 315. The main test system may also host a separate test client 320 and an administrative client 318. The server 311 may host a computer application 335 that provides a graphical user interface that may receive inputs selecting a computer application function for activation. The administrative client 318 executing or accessing on a server, such as server 311, the computer application 335, may be used by an administrative user that tests the computer application functions provided in the enhancement packages to select the computer application functions for testing and activation. In addition, according to the test category and characteristic of the selected function a test environment, such as any one of a main test system 310, a separate test client 320, a development test system 345, an administrative client 318, separate test system 350, and a production system 360, can be indicated for testing the selected function. For example, the selected activated functions YYY may be provided to the respective test environment, while the inactive functions XXX are indicated as not to be tested. Additionally, the selected computer application function may be transferred to the indicated test environment for the appropriate testing. In other words, the selected computer application function is available in all test environments, but will be activated only in the test environment where testing will be performed. Only the computer application functions that have been activated, i.e., switched on, may be tested in any of the test environments, such as the main test system 310, the development test system 345, the separate test system 350, or the production system 360. The inactivate computer application functions may not be tested in any of the test environments. Note that the development test system 345, the separate test system 350, and the production system 360 may also each include a server, a client terminal of the production system 360, and data storage.

The main test system 310 may communicate with the other test environments, e.g., the development test system 345, the separate test system 350, or the production system 360, to provide the activated functions, such as functions YYY, to the respective test sets based on the recommendations provided by the application 335.

Figure 4:
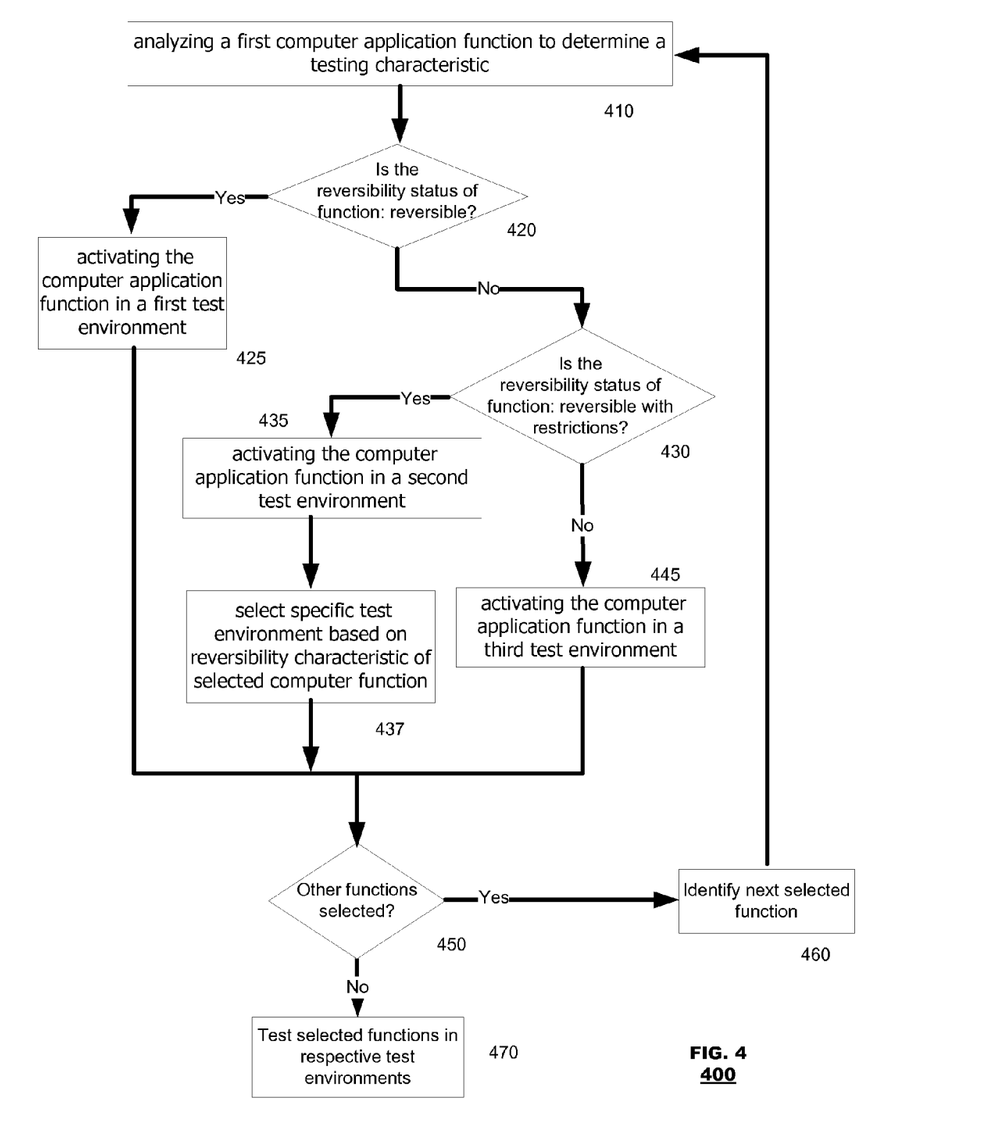
FIG. 4 illustrates an exemplary process for selecting a test environment according to an embodiment of the present invention.

FIG. 4 illustrates an exemplary process for selecting a test environment according to an embodiment of the present invention. The process 400 for selecting a test environment may begin with a step 410 of analyzing a first selected computer application function to determine a reversibility category and characteristic. A processor may analyze attributes in the data records of the selected computer application function to determine the reversibility category and characteristics. Upon a determination of the reversibility category or characteristic of the selected computer application function, a decision may be made at step 420 whether the reversibility category or characteristic is reversible. If the response is YES, the selected computer application function is reversible, the process 400 proceeds to step 425. At step 425, the selected computer application function is opened in a first test environment. Given that the selected computer application function has a reversibility status of reversible, the first test environment may be any one of a production system and a development and quality assurance test system as suggested in FIG. 2. The development and quality assurance test system may include a main test client. However, if the response to the inquiry at 425 is "No, the reversibility status is not reversible", the process 425 may proceed to another inquiry at step 430. At step 430, it may be determined whether the reversibility status of the selected computer application function is "reversible with restrictions." If the determination at step 430 is "Yes, the status is reversible with restrictions", the process 400 may proceed to activating the selected computer application function in a second test environment. The second test environment may be a development and quality assurance test system based, for example, on the recommendations shown in FIG. 2. Depending upon the reversibility characteristic of the selected function, a specific test environment may be selected. For example, if the reversibility characteristic is "Uncritical application or custom data remaining", the selected computer application function may be scheduled for testing on a main test client, or if the reversibility characteristic is "critical application or custom data remaining", the selected computer application function may be scheduled or processed for testing on a separate test client may be the recommendation. However, if the response to the inquiry at step 430 is "No, the status is not reversible with restrictions", this indicates that the selected computer application function has a reversibility status of "not reversible." In which case, the process 400 proceeds to step 445, where the selected computer application function may be activated in a third test environment. The third test environment may be a separate test system as recommended in FIG. 2.

After activating the selected test function in a testing environment, the process 400 proceeds to step 450 to determine if other computer application functions have been selected. If the determination is "Yes", the process 400 proceeds to step 460. At step 460, the next selected computer application function may be identified and the process 400 may return to step 410 to analyze the next computer application function. Alternatively, if at step 460 it is determined no other selected computer application functions remain, the process 400 may proceed to step 470. At step 470, the selected functions may be tested in the respective test environments. Advantageously, the described process may prevent execution and testing of computer application functions that may result in system errors or instability in a particular test environment or in a production system.

The exemplary method and computer program instructions may be embodied on a non-transitory machine readable storage medium such as a computer disc, optically-readable media, magnetic media, hard drives, RAID storage device, and flash memory. In addition, a server or a database server may include non-transitory machine readable media configured to store machine executable program instructions. The features of the disclosed embodiments may be implemented in hardware, software, firmware, or a combination thereof and utilized in systems, subsystems, components or subcomponents thereof. When implemented in software, the elements of the disclosed embodiments are programs or the code segments used to perform the necessary tasks. The program or code segments can be stored on non-transitory machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for selectively testing computer application functions in a product update package, comprising:
    analyzing, by a processor, a computer application function in the product update package to determine a testing category assigned to the computer application function according to a reversibility status;
    based on the analysis, by the processor, indicating that the testing category is either a first testing category denoting the computer application function is reversible, a second testing category denoting the computer application function is not reversible, or a third testing category denoting the computer application function is reversible with restrictions;
    in response to the indication that the testing category for the computer application is the first testing category, activating the computer application function in a first test environment;
    in response to the indication that the testing category for the computer application is the second testing category, activating the computer application function in a second test environment;
    in response to the indication that the testing category for the computer application is the third testing category, analyzing, by the processor, the computer application function to determine a testing characteristic, wherein the testing characteristic is a sub-category providing finer granularity of the testing category that denotes the effects of testing the corresponding computer application on a test environment;
    in response to the determination of the testing characteristic, activating the computer application function in a third test environment selected from a plurality of test environments based on the determined testing characteristic; and
    testing the computer application function in the respective test environment.

2. The method of claim 1, comprising:
    after completion of the testing in the first test environment, deactivating the computer application function; and
    allowing the generated test data to remain in a data storage device connected to the first test environment, wherein the test data generated by the testing of the computer application function does not interfere with the subsequent testing of other computer application functions.

3. The method of claim 1, comprising:
    generating in the second test environment, by the computer application function during testing, test data that will interfere with the operation of subsequent computer application functions activated on the second test environment; and
    deleting the computer application function and the generated test data from the second test environment.

4. The method of claim 1, comprising:
    based on the analysis of the testing characteristic, preventing the computer application function from being activated in the first test environment.

5. The method of claim 4, wherein the first test environment is a production computer system.

6. The method of claim 1, wherein the second test environment is a separate test computer system that is setup anew after completion of the testing, wherein the generated test data is deleted from data storage associated with the separate test computer system.

7. The method of claim 1, wherein the third test environment is a main test set computer system including main test set data storage.

8. A computer system for selectively testing computer application functions in a product update package, comprising:
    a display device for presenting a listing of computer application functions that require testing;
    a data storage device for storing data;
    a server for managing test set environments for testing the computer application functions;
    a graphical user interface generated by a processor and presented on the display device for facilitating selection of a computer application function for testing from the listing of computer application functions;
    wherein the processor is connected to the display device and to a plurality of test environments, and the processor is configured to:
    analyze a computer application function to determine a testing category assigned to the computer application function according to a reversibility status;
    based on the analysis, indicate that the testing category is either a first testing category denoting the computer application function is reversible, a second testing category denoting the computer application function is not reversible, or a third testing category denoting the computer application function is reversible with restrictions;
    in response to the indication that the testing category for the computer application is the first testing category, activate the computer application function in a first test environment;
    in response to the indication that the testing category for the computer application is the second testing category, activate the computer application function in a second test environment;
    in response to the indication that the testing category for the computer application is the third testing category, analyze the computer application function to determine a testing characteristic, wherein the testing characteristic is a sub-category providing finer granularity of the testing category that denotes the effects of testing the corresponding computer application on a test environment;
    in response to the determination that the testing category is the third testing category, activate the computer application function in a third test environment selected from a plurality of test environments based on the determined testing characteristic; and
    test the computer application function in the respective test environment based on the analysis indication.

9. The computer system of claim 8, the processor is further configured to:
 after completion of testing in the first test environment, deactivate the computer application function; and
 allow generated test data to remain in a data storage device connected to the first test environment, wherein the test data generated by the testing of the computer application function does not interfere with the subsequent testing of other computer application functions.

10. The computer system of claim 8, wherein the third test environment is a main test set computer system.

11. The computer system of claim 8, the processor is further configured to:
 based on the analysis of the testing characteristic, prevent the computer application function from being activated in the first test environment.

12. The computer system of claim 8, wherein the second test environment is a separate test computer system that is setup anew after completion of the testing, wherein generated test data is deleted from data storage associated with the separate test computer system.

13. The computer system of claim 8, wherein the first test environment is a production computer system.

14. The computer system of claim 8, wherein the processor is further configured to:
 generate by executing the computer application function during testing in the second testing environment, test data that will interfere with the operation of subsequent computer application functions operated on the second test environment; and
 delete the computer application function and the generated test data from the second test environment.

15. A non-transitory machine-readable storage medium embodied with computer program instructions for causing a processor to execute a method for selectively testing computer application functions in a product update package, the method comprising:
 analyzing, by a processor, a computer application function to determine a testing category assigned to the computer application function according to a reversibility status;
 based on the analysis, by the processor, indicating that the testing category is either a first testing category denoting the computer application function is reversible, a second testing category denoting the computer application function is not reversible, or a third testing category denoting the computer application function is reversible with restrictions;
 in response to the indication that the testing category for the computer application is the first testing category, activating the computer application function in a first test environment;
 in response to the indication that the testing category for the computer application is the second testing category, activating the computer application function in a second test environment;
 in response to the indication that the testing category for the computer application is the third testing category, analyzing, by the processor, the first computer application function to determine a testing characteristic, wherein the testing characteristic is a sub-category providing finer granularity of the testing category that denotes the effects of testing the corresponding computer application on a test environment;
 in response to the determination that the testing category is the third testing category, activating the first computer application function in a third test environment selected from a plurality of test environments based on the determined testing characteristic; and
 testing the computer application function in the respective test environment based on the analysis indication.

16. The machine-readable storage medium of claim 15, further comprising:
 after completion of the testing, deactivating the computer application function in the first test environment; and
 allowing generated test data to remain in a data storage device connected to the first test environment, wherein the test data generated by the testing of the computer application function does not interfere with the subsequent testing of other computer application functions.

17. The machine-readable storage medium of claim 15, further comprising:
 generating in the second test environment, by the computer application function during testing, test data that will interfere with the operation of subsequent computer application functions activated on the second test environment; and
 deleting the computer application function and the generated test data from the second test environment.

18. The machine-readable storage medium of claim 15, further comprising:
 based on the analysis of the testing characteristic, preventing the computer application function from being activated in the first test environment.

19. The machine-readable storage medium of claim 15, wherein the first test environment is a production computer system.

20. The machine-readable storage medium of claim 15, wherein the second test environment is a separate test computer system that is setup anew after completion of the testing, wherein the generated test data is deleted from data storage associated with the separate test computer system.

21. The machine-readable storage medium of claim 15, wherein the third test environment is a main test set computer system including main test set data storage.

22. The method of claim 1 wherein one of:
 the computer application function is reversible because it includes one of (a) pure user interface changes, and (b) a complete new independent application; and
 the computer application function is reversible with restrictions because it includes one of (a) an uncritical application or custom data remaining, (b) a critical application or custom data remaining, and (c) an uncritical cross client application or custom data changes.

23. The computer system of claim 8 wherein one of:
 the computer application function is reversible because it includes one of (a) pure user interface changes, and (b) a complete new independent application; and
 the computer application function is reversible with restrictions because it includes one of (a) an uncritical application or custom data remaining, (b) a critical application or custom data remaining, and (c) an uncritical cross client application or custom data changes.

24. The machine-readable storage medium of claim 15 wherein one of:
 the computer application function is reversible because it includes one of (a) pure user interface changes, and (b) a complete new independent application; and
 the computer application function is reversible with restrictions because it includes one of (a) an uncritical application or custom data remaining, (b) a critical application or custom data remaining, and (c) an uncritical cross client application or custom data changes.

* * * * *